United States Patent [19]

Dennison et al.

[11] Patent Number: 5,546,445

[45] Date of Patent: *Aug. 13, 1996

[54] CELLULAR TELEPHONE SYSTEM THAT USES POSITION OF A MOBILE UNIT TO MAKE CALL MANAGEMENT DECISIONS

[76] Inventors: Everett Dennison, 200 Glenview; Edwin L. Nass, P.O. Box 92, 231 W. Main St., both of Canfield, Ohio 44406; Timothy J. Duffy, 102 Elliot Rd., West Middlesex, Pa. 16159; Gregory T. Pauley, 99 Hilltop Blvd., Canfield, Ohio 44406; Scott L. Jones, 93 White Ave., Sharon, Pa. 16146; Deborah J. Shale, 3020 Thunderbird Dr., Poland, Ohio 44514

[ * ] Notice: The term of this patent shall not extend beyond the expiration date of Pat. No. 5,235,633.

[21] Appl. No.: 555,884

[22] Filed: Oct. 23, 1995

Related U.S. Application Data

[63] Continuation of Ser. No. 402,976, Mar. 13, 1995, which is a continuation-in-part of Ser. No. 57,833, May 7, 1993, abandoned, which is a continuation-in-part of Ser. No. 813,494, Dec. 26, 1991, Pat. No. 5,235,633.

[51] Int. Cl.[6] ..................................................... H04Q 7/38
[52] U.S. Cl. ........................... 379/60; 379/114; 379/121; 379/134; 455/33.2
[58] Field of Search .................... 379/58–60, 111–114, 379/121, 133, 134; 455/12.1–13.2, 33.1, 33.2, 54.1; 342/190, 191, 352, 357, 450, 451, 452, 454, 456, 457, 458, 464

[56] References Cited

U.S. PATENT DOCUMENTS

| | | | |
|---|---|---|---|
| 4,144,411 | 3/1979 | Frenkiel | 379/60 |
| 4,177,466 | 12/1979 | Reagan . | |
| 4,229,620 | 10/1980 | Schnaible | 342/458 |
| 4,232,317 | 11/1980 | Freeny, Jr. | 342/464 |
| 4,233,473 | 11/1980 | Frost | 379/59 |
| 4,700,374 | 10/1987 | Bini | 379/60 |
| 4,788,711 | 11/1988 | Nasco, Jr. | 379/59 |
| 4,818,998 | 4/1989 | Aspell et al. . | |
| 4,908,629 | 3/1990 | Aspel et al. . | |

(List continued on next page.)

FOREIGN PATENT DOCUMENTS

| | | |
|---|---|---|
| 199266 | 4/1986 | European Pat. Off. . |
| 398773 | 4/1990 | France . |
| 2-210923 | 8/1990 | Japan . |
| 292182 | 11/1988 | United Kingdom . |
| PCT01242 | 2/1992 | WIPO . |

OTHER PUBLICATIONS

"Billing Systems: they aren't just for billing anymore," Cellular Business, v9, n12, p. 24, Nov., 1992.
"The Pseudo-Synchronisation, A Costless Feature To Obtain The Gains of A Synchronised Cellular Network," Nov., 1991, Nice, Valbonne, FR.
"Real Time," Billing World, Jul. Aug. 1995, pp. 39–40.
AT&T 92 TNT 203–29, Oct. 7, 1992, pp. 17–39, Jun., 1995.

Primary Examiner—Dwayne D. Bost
Attorney, Agent, or Firm—Terry M. Gernstein

[57] ABSTRACT

A cellular telephone system includes a plurality of cell sites and a mobile telephone switching office. Call management, including selection of a cell site most appropriate for a call associated with a mobile unit, are made based on the geographic location of the mobile unit as opposed to the strength of the signal associated with the call. The geographic location of the mobile unit is precisely determined using a NAVSTAR global positioning system, or its equivalent. Each mobile unit includes a GPS receiver that receives information from a geostationary satellite to determine the precise location of the mobile unit. This position information is relayed to the cell site initially managing the mobile unit, and the mobile unit is handed off to a cell site that is most appropriate for the call. Initial selection of an entrance cell site is made based on signal strength, but further call management decisions are made based on location of the mobile unit.

20 Claims, 13 Drawing Sheets

U.S. PATENT DOCUMENTS

| | | | |
|---|---|---|---|
| 4,914,651 | 4/1990 | Lusignan . | |
| 4,972,456 | 11/1990 | Kaczmarek | 379/59 |
| 4,977,399 | 12/1990 | Price | 379/59 |
| 5,043,736 | 8/1991 | Darnell et al. | 342/357 |
| 5,054,110 | 10/1991 | Comroe et al. | 379/59 |
| 5,056,109 | 10/1991 | Gilhousen | 379/59 |
| 5,081,667 | 1/1992 | Drori et al. . | |
| 5,081,703 | 1/1992 | Lee | 455/13.1 |
| 5,086,452 | 2/1992 | Ito et al. | 379/58 |
| 5,093,925 | 3/1992 | Chanroo | 379/59 |
| 5,155,689 | 10/1992 | Wortham . | |
| 5,170,490 | 12/1992 | Cannon et al. | 455/72 |
| 5,187,805 | 2/1993 | Bertiger et al. . | |
| 5,214,789 | 5/1993 | George | 455/33.2 |
| 5,218,716 | 6/1993 | Comroe . | |
| 5,222,249 | 6/1993 | Carney . | |
| 5,223,844 | 6/1993 | Mansell et al. . | |
| 5,227,802 | 7/1993 | Pullman et al. . | |
| 5,235,633 | 8/1993 | Dennison et al. | 379/60 |
| 5,260,968 | 11/1993 | Gardner et al. . | |
| 5,278,892 | 1/1994 | Bolliger et al. . | |
| 5,299,132 | 3/1994 | Wortham . | |
| 5,309,474 | 5/1994 | Gilhousen et al. . | |
| 5,315,636 | 5/1994 | Patel . | |
| 5,321,514 | 6/1994 | Martinez | 348/723 |
| 5,334,974 | 8/1994 | Simms et al. . | |
| 5,343,393 | 8/1994 | Hirano et al. . | |
| 5,361,399 | 11/1994 | Linquist et al. . | |
| 5,365,516 | 11/1994 | Jandrell . | |
| 5,375,140 | 12/1994 | Bustamante et al. . | |
| 5,390,339 | 2/1995 | Bruckert et al. . | |
| 5,392,287 | 2/1995 | Tiedemann, Jr. . | |
| 5,396,540 | 3/1995 | Gooch . | |
| 5,398,190 | 3/1995 | Wortham . | |
| 5,410,728 | 4/1995 | Bertiger et al. . | |

LOOK-UP TABLE
Boundary Points
(minimum 4)

Cell Site #1
1  (Latitude, Longitude)
2  (Latitude, Longitude)
3  (Latitude, Longitude)
4  (Latitude, Longitude)
5  (Latitude, Longitude)

Cell Site #2
1  (Latitude, Longitude)
2  (Latitude, Longitude)
3  (Latitude, Longitude)
4  (Latitude, Longitude)

Cell Site #N

*FIG. 9*

CELLULAR TELEPHONE SYSTEM THAT USES POSITION OF A MOBILE UNIT TO MAKE CALL MANAGEMENT DECISIONS

This is a continuation of application Ser. No. 08/402,976 filed on Mar. 13, 1995, which is a continuation-in-part of Ser. No. 08/057,833, filed on May 7, 1993 and is now abandoned, which was a continuation-in-part of Ser. No. 07/813,494 filed on Dec. 26, 1991 and which is now U.S. Pat. No. 5,235,633.

TECHNICAL FIELD OF THE INVENTION

The present invention relates to the general art of cellular mobile radiotelephone (CMR) technology, and to the particular field of managing the calls in a cellular system.

BACKGROUND OF THE INVENTION

CMR is a rapidly growing telecommunications system. The typical CMR system includes a multiplicity of cells, such as indicated in FIG. 1. A particular geographic area is subdivided into a multiplicity of subareas, with each of the subareas being serviced by a stationary transmitter/receiver setup. The cells are set up to carry signals to and from mobile units M in the range of the cell. If one cell becomes too crowded, it can be divided into smaller cells, by a process known as cell splitting. As can be seen from FIG. 1, any particular geographic area can become quite complicated with cells overlapping each other, and overlapping cells of other neighboring cellular systems. It is noted that the term "cellular" is intended to be a term of convenience, and is not intended to be limiting. The present disclosure is intended to encompass any communication system in which an overall area can be divided into one or more subareas such as shown in FIG. 1.

A typical CMR set up is indicated in FIGS. 2 through 7, and will be described so an understanding of the problem to which this invention is directed can be obtained.

FIGS. 2, 3 and 4 show a typical cellular telephone unit 2 having a unique mobile identification number stored in a suitable location such as an electrically erasable programmable read-only memory (not shown). Telephone units of this kind are known to those skilled in this art, and thus will not be described in detail.

The telephone unit 2 includes a handset 4 having a keypad 5 as well as a speaker 6 and a microphone 7. A transceiver 8, ordinarily built into the telephone unit 2, exchanges signals via an antenna 10 with a mobile telecommunications switching office or MTSO 12 via a cell site 14. A duplexer 15 connects the antenna to the transceiver. The cell site 14 includes an antenna 16 connected to a control terminal 17 via a transceiver 18. The cell 14 is connected to the MTSO via a transmission link 20.

Referring to FIGS. 4A and 5, the operation of the CMR can be understood. The mobile unit M moves about the geographic areas covered by the various cells as indicated in FIG. 1. As that mobile unit moves about, it decodes the overhead message control signals generated by various cell site control channels. The mobile unit locks onto the cell site that is emitting the strongest signal. The mobile unit rescans channels periodically to update its status. If, for example, a fixed-position land-based telephone T is used to call the mobile unit, a signal is sent via landlines L, to the central office CO of a public/switched telephone system (PTSN) 12A. This system then utilizes the switching network SN associated therewith to call the MTSO 12 via a transmission link L1. The MTSO then utilizes its own switching network and generates a page request signal to all cell sites via transmission links, such as the transmission link 20. The cell site which has been notified of the presence of the mobile unit M sends a signal back to the MTSO via the landlines alerting the MTSO of the presence of the mobile unit. The MTSO then orders the mobile unit, via the notifying cell site, to tune to an assigned channel and receive the call. Billing and other business information are recorded in the MTSO at this time.

On the other hand, during call origination, the mobile unit rescans the control channels to determine which is the best server based on signal strength. Upon selecting the best server, the mobile unit transmits call site information on the control channel receive frequency and then receives a voice channel to tune to if the mobile unit is authorized to place a call.

As the mobile unit moves, the signal strength between that mobile unit and the originating cell site changes, and perhaps diminishes. Since signal strength is an inverse function of the square of the distance between the mobile unit and the cell site, signal strength can change rapidly and drastically as the mobile unit moves with respect to the cell site and therefore must be monitored closely. Moreover, signal strength can be strongly affected by terrain, environmental conditions as well as interference from other sources. The MTSO has a signal strength table ST, and signal strength from the mobile unit is constantly compared to acceptable signal strength levels in the table. Such a table can be located in each cell site if desired.

Should signal strength diminish below a preset range, the MTSO generates a "locate request" signal to all cell sites that neighbor the original cell site. Each of such neighboring cell sites receiving a signal from the mobile unit signals the MTSO, and the signal strength from such neighboring cell sites are checked against the signal strength table. The MTSO makes a decision as to which cell site should control the call, and notifies the original cell site to order the mobile unit to retune to a voice channel of the new cell site.

As soon as the mobile unit retunes, the mobile unit completes the call via the new cell site channel. This transfer of control is known as a handoff.

While this method of making switching decisions has worked well in the past, the growth and sophistication of the cellular industry has resulted in severe drawbacks to this method. First, due to uneven terrain, unpredictable environmental conditions, interference and the like, many cellular companies have been required to construct numerous cell sites. These cells often overlap neighboring cell sites and provide redundant coverage. This is extremely expensive, not only from the standpoint of construction costs, but due to monitoring and staffing costs as well. Even at this, conditions can change so rapidly that coverage may still be inconsistent.

Still further, due to idiosyncrasies in terrain and environment, a mobile unit may use a cell that is located far from the mobile unit rather than a cell located immediately adjacent to that mobile unit. Hilly terrain is a common example of this problem. While this may not be a technical problem, it is important because a cellular company cannot assess long distance charges and/or message units to the calls. This deprives the cellular company of income that it could otherwise receive and customers of optimum service. Communities are also deprived of tax income that might be assessed against such calls as well.

Still further, since only signal strength is used to make switching decisions, the location of a caller is not ascertainable. This could be important in keeping track of calls.

Other problems that have been experienced in such cellular systems include the inability to completely control the cell site transmit signal, crosstalk noise interference, dropped calls, overlap and an inability to adequately service areas with undulating terrain without infringing the borders of other cellular territories.

Therefore, there is a need for a cellular system that can provide consistently high quality service, yet can do so with a minimum number of cell sites in a particular geographic area. Still further, there is a need for a cellular system that can accurately assess charges for all CMR services including message units for calls covering a certain distance within the geographic area.

OBJECTS OF THE INVENTION

It is a main object of the present invention to provide a cellular system that can provide high quality service using only a minimum number of cell sites within a given geographic area.

It is another object of the present invention to provide a cellular system that can accurately track a mobile unit within the geographic area covered by the cellular system.

It is another object of the present invention to provide a cellular system that can assess charges for calls based on the geographic location of the call.

SUMMARY OF THE INVENTION

These, and other, objects are achieved by a cellular system that makes switching and call management decisions based on the location of a mobile unit rather than on the strength of the signal associated with that mobile unit. The exact location of each mobile unit is determined using a Global Positioning System (GPS), LORAN, or other position determining system. The NAVSTAR global positioning system, or GPS, is a system employing ultimately eighteen satellites in twelve hour orbits of $55°$ inclination. The system is being implemented by the Department of Defense for military use. However, it has a "clear access" (C/A) channel that is available for general civil use. The GPS is a passive navigation system on the part of the user, in that only reception of satellite-transmitted signals is required by the user to compute position. The GPS provides a capability for continuous position determination, and a position can be computed on the order of every second of time, and thus provides a capability of determining the position of a highly mobile vehicle. A full discussion of the GPS is presented in textbooks, such as "Handbook of Modern Electronics and Electrical Engineering," edited by Charles Belove and published in 1986 by Wiley-Interscience (see chapter 54 thereof, the disclosure of which is incorporated herein by reference), and includes a satellite positioned in a geostationary orbit and communicating with ground-based receivers. Based on the signals received from the satellite, the exact position in longitude and latitude, of the ground-based receiver can be determined with an extremely high degree of accuracy and precision.

The exact longitude and latitude of the mobile unit is then communicated to the MTSO, and the cell site that services that particular position is signalled by the MTSO to carry the call associated with the mobile unit. The position of the mobile unit is constantly updated, and call management decisions, such as handoffs, can be made based on the location of the mobile unit rather than the strength of the signal associated with that unit. The MTSO has a look-up table in its data storage facilities that compares positional data from the mobile units to data associated with cell site coverage areas. Based on a look up in this table, the MTSO can select the cell site most appropriate to a call.

Since the position of the mobile unit is known to the MTSO, the assessment of message units, taxes, and other charges can be made. The billing will be more consistent than is possible with present systems. Of course, call routing will be greatly improved in the system of the present invention as compared to prior systems.

Still further, since call management decisions are made based on position of the mobile unit, the number of cell sites can be reduced as communication is not subject to vagaries of weather or the like to the degree that call management decisions based on signal strength are. Even with the reduced number of cell sites, the quality of calls using such a system is improved due to proper handoff. The system is quite flexible, and cell site placement and frequency reuse are extremely efficient since call management is much more precise than in systems that use signal strength to make call management decisions.

The cellular system of the present invention in which call management decisions are made based on position of the mobile unit can reduce or eliminate the provision of cellular service beyond the authorized area, in effect reducing the interference to and from neighboring cellular carriers (reduction of inter-system interference) and more precisely define the inter-system service boundaries and handoff parameters. This system also permits precise definition of service boundaries for individual cell sites thereby allowing for greater system control and the reduction of intra-system interference. Still further, accurate and detailed cell site usage and traffic pattern data can be developed in the present system, thereby enabling accurate and precise control of system growth. The present cellular system can also be real-time tailored based on current cellular use.

BRIEF DESCRIPTION OF THE DRAWING FIGURES

FIG. 9 illustrates a look-up table that is incorporated into the MTSO of the present invention to make call management decisions based on the location of a mobile unit.

Figure 11A:
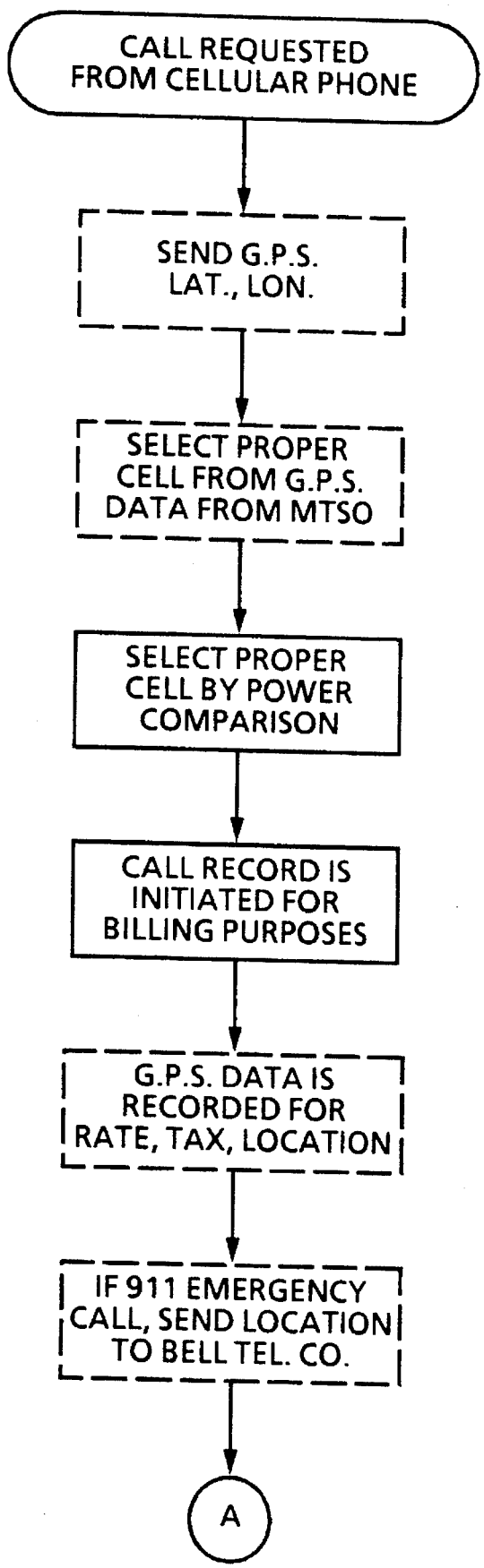
Figure 11B:
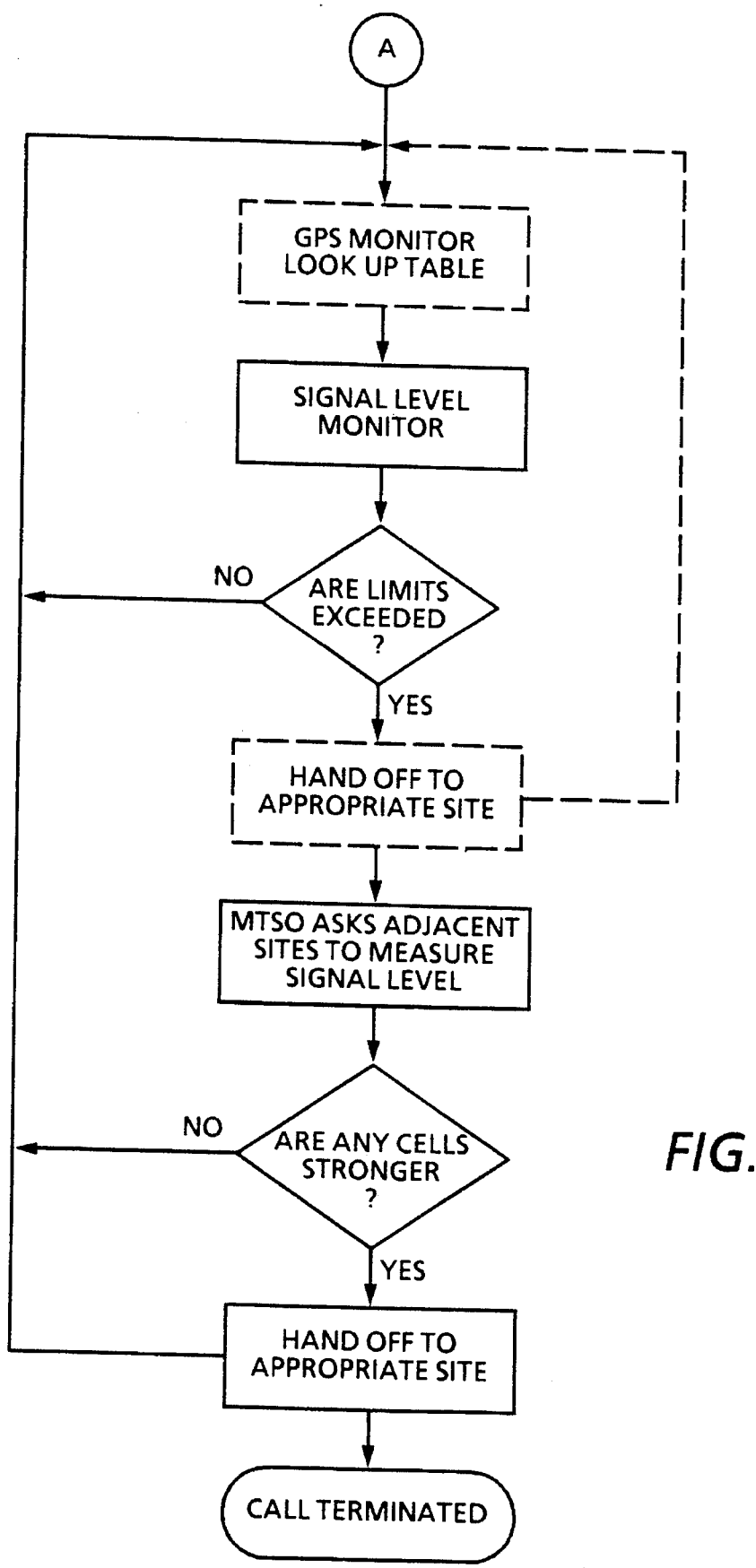

FIG. 11A and 11B comprise a flow chart illustrating a call sequence between a mobile unit and another unit in which switching decisions are made based on the position of the mobile unit rather than the strength of the signal associated with the mobile unit.

DETAILED DESCRIPTION OF THE PREFERRED EMBODIMENT OF THE INVENTION

Figure 1:
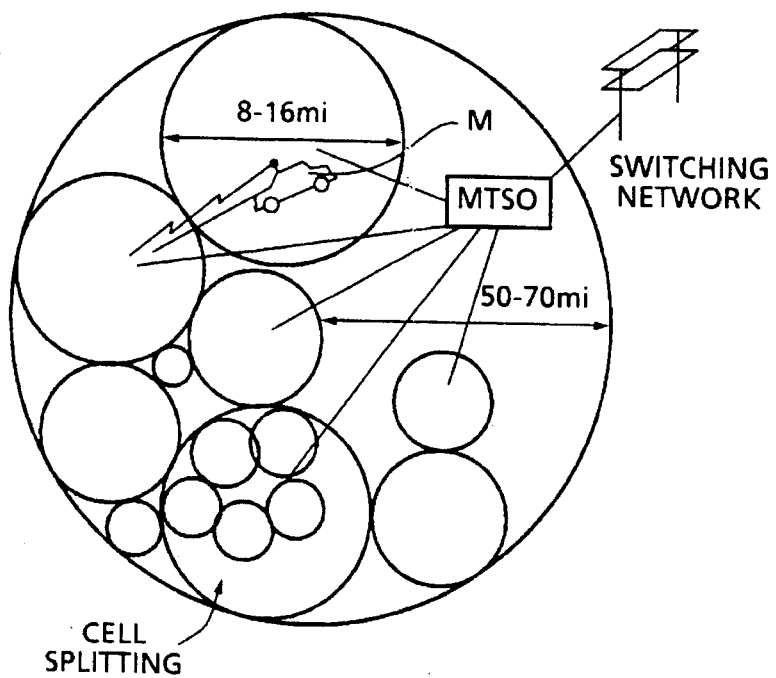
FIG. 1 illustrates a geographic area divided into a multiplicity of cells.
Figure 2:
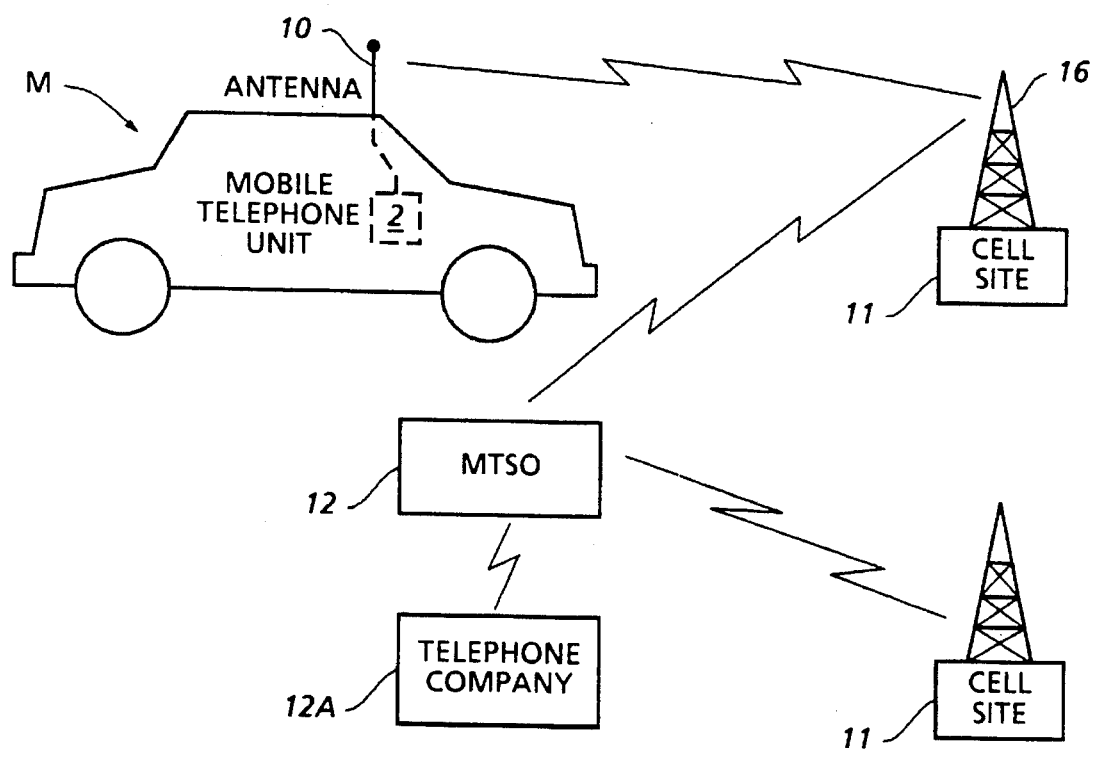
FIG. 2 illustrates a typical prior art mobile cellular telephone and its link with a fixed cell site and an MTSO.
Figure 3:
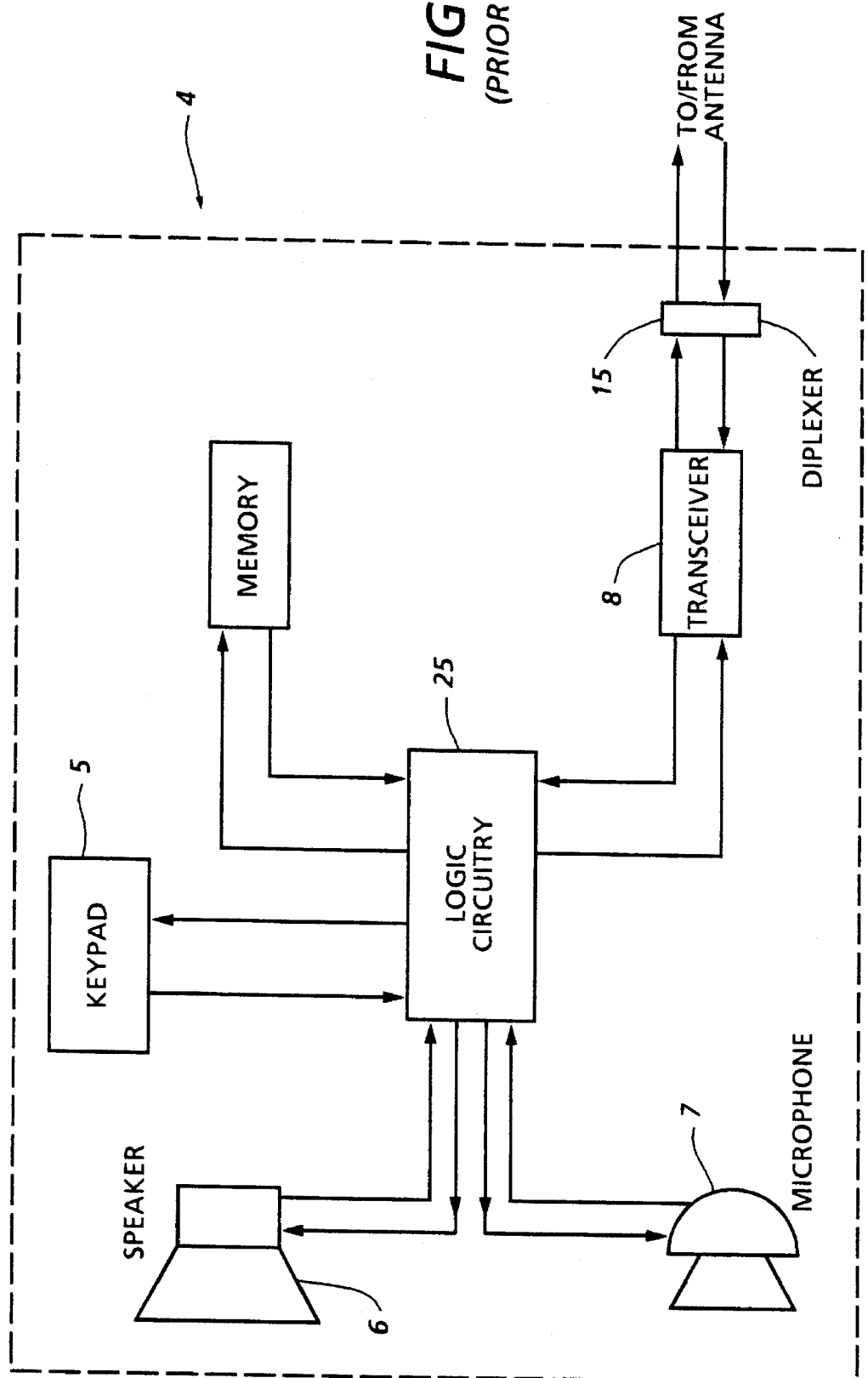
FIG. 3 illustrates the mobile unit of the cellular telephone system shown in FIG. 2.
Figure 4:
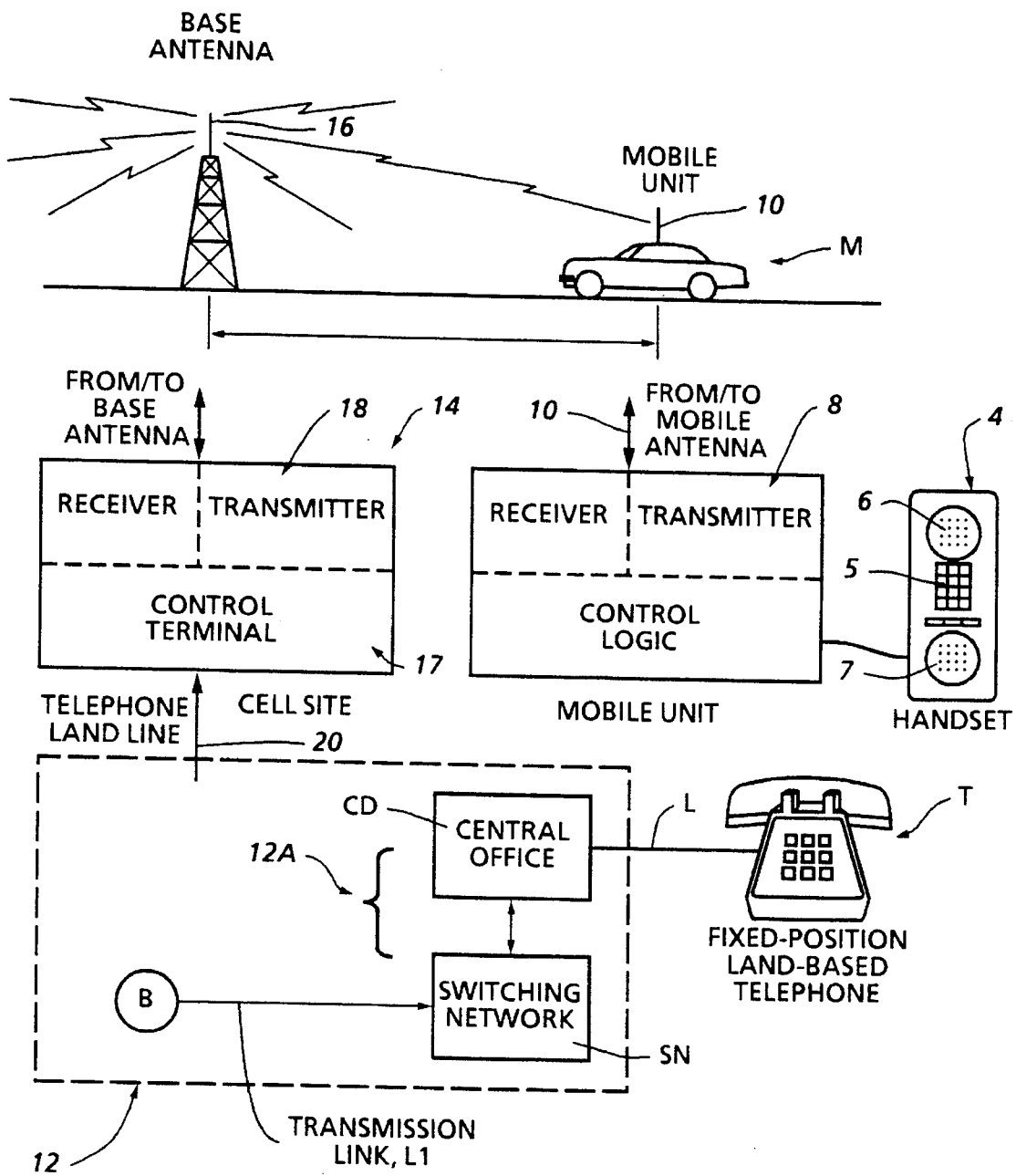
FIG. 4 illustrates a typical prior art cellular system in which a mobile unit can be connected with a fixed-position unit.
Figure 4A:
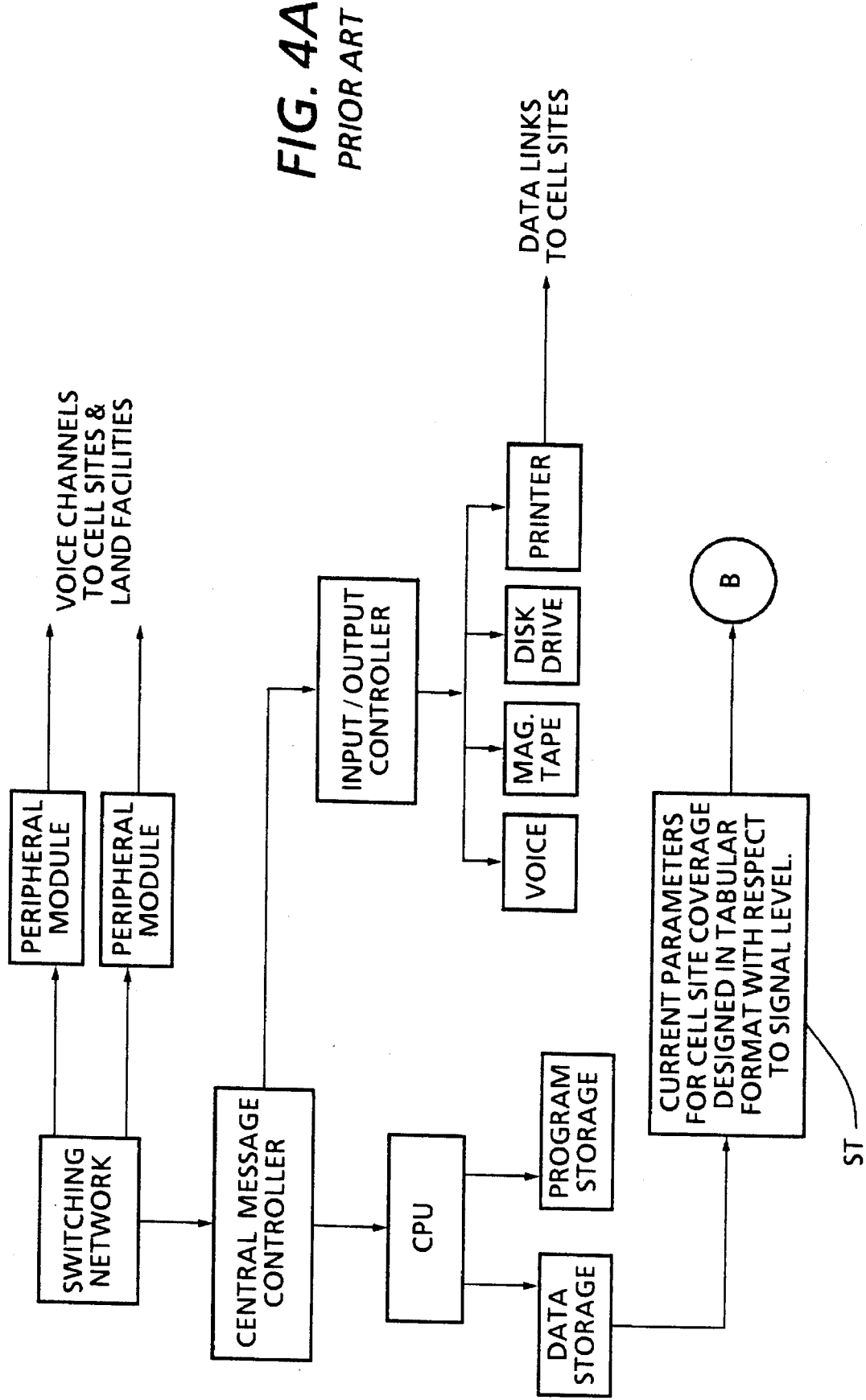
Figure 5:
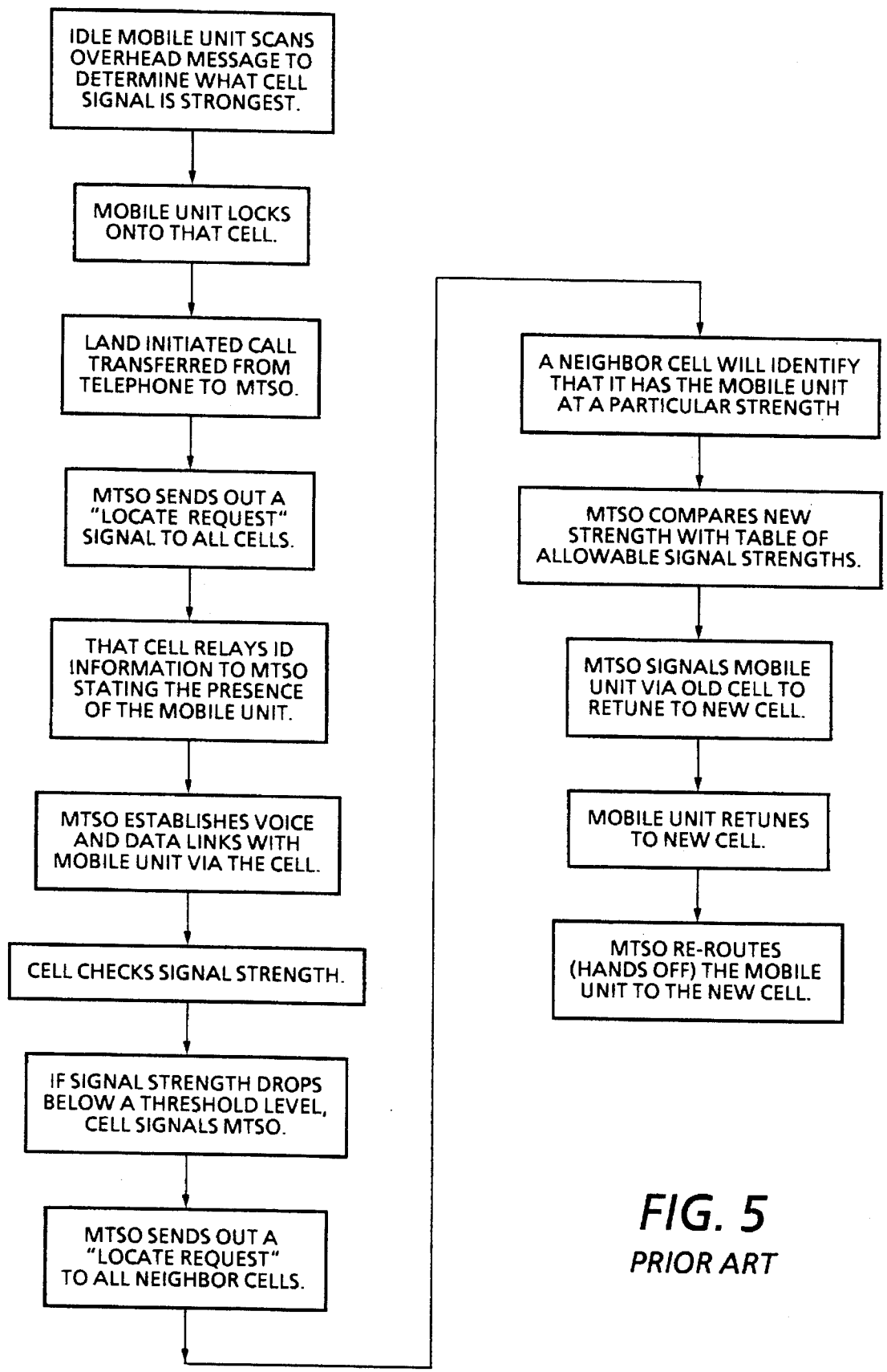
FIG. 5 is a flow diagram of a call originated by the PTSN (public service telephone network) and a mobile unit using a prior art cellular system.
Figure 6:
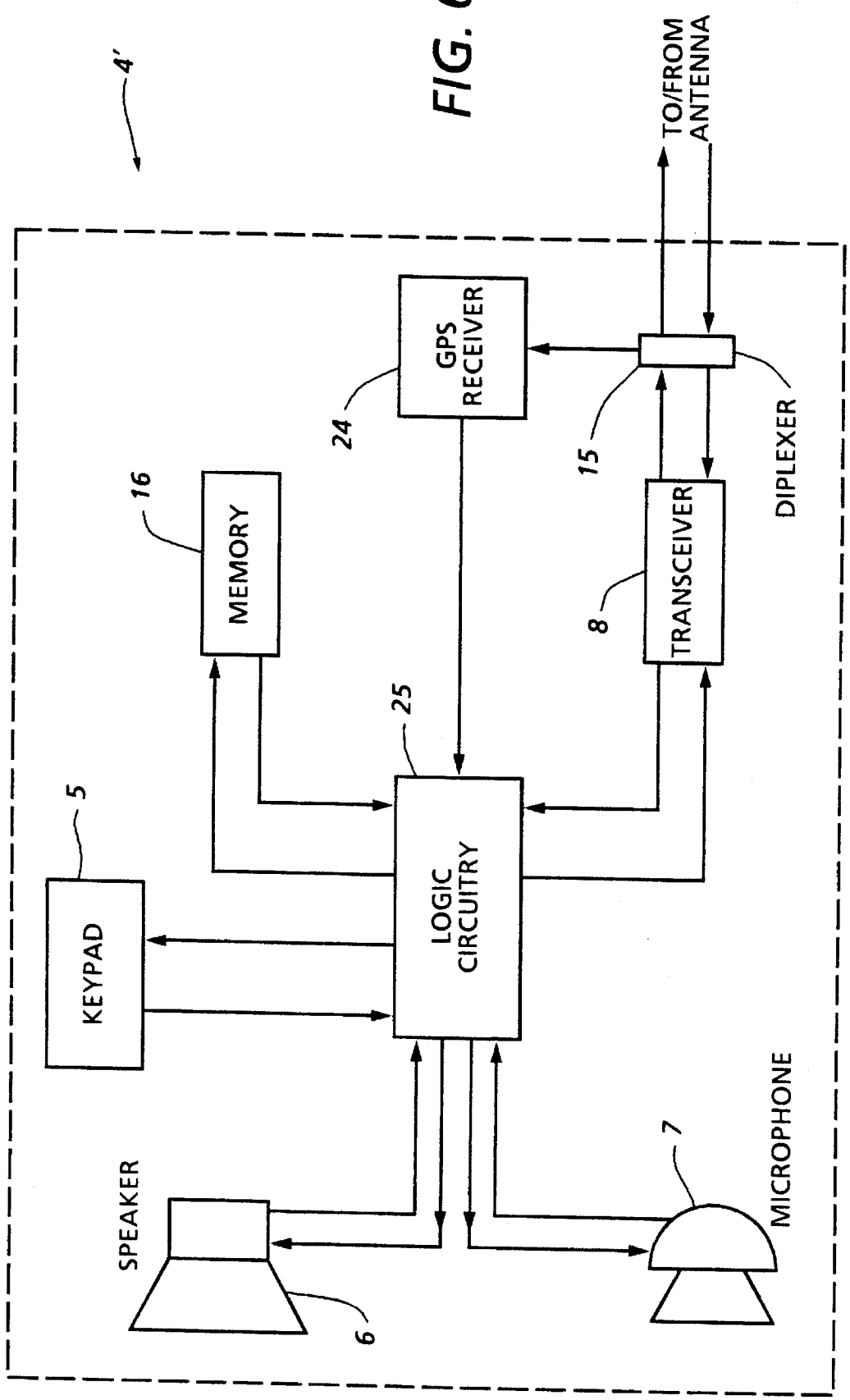
FIG. 6 is a block diagram of a mobile unit of a cellular telephone system which incorporates a GPS location determining system embodying the present invention.
Figure 7:
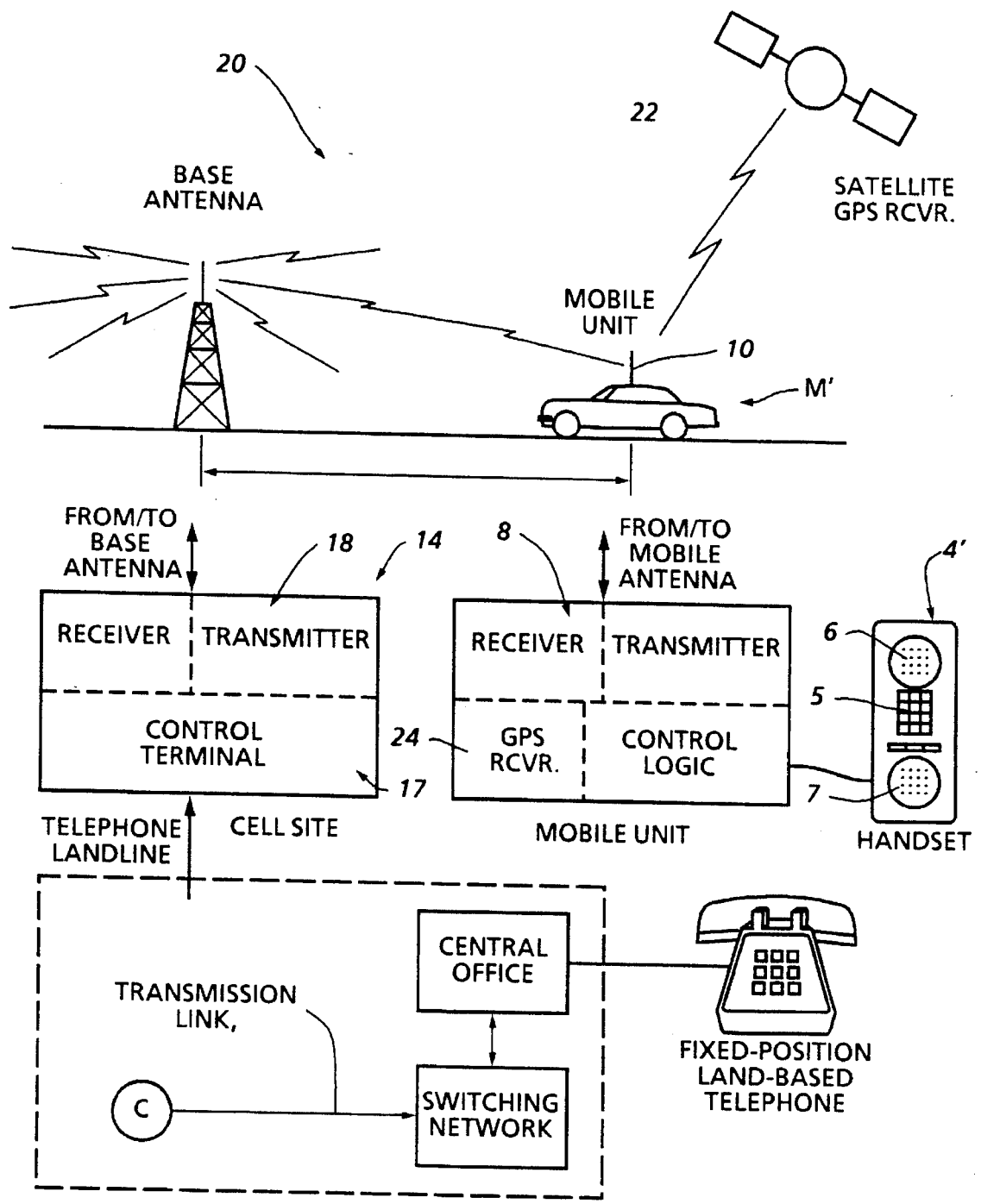
FIG. 7 illustrates a cellular system incorporating a GPS position locating system for a mobile unit communicating with other units, such as the fixed-position unit shown.
Figure 7A:
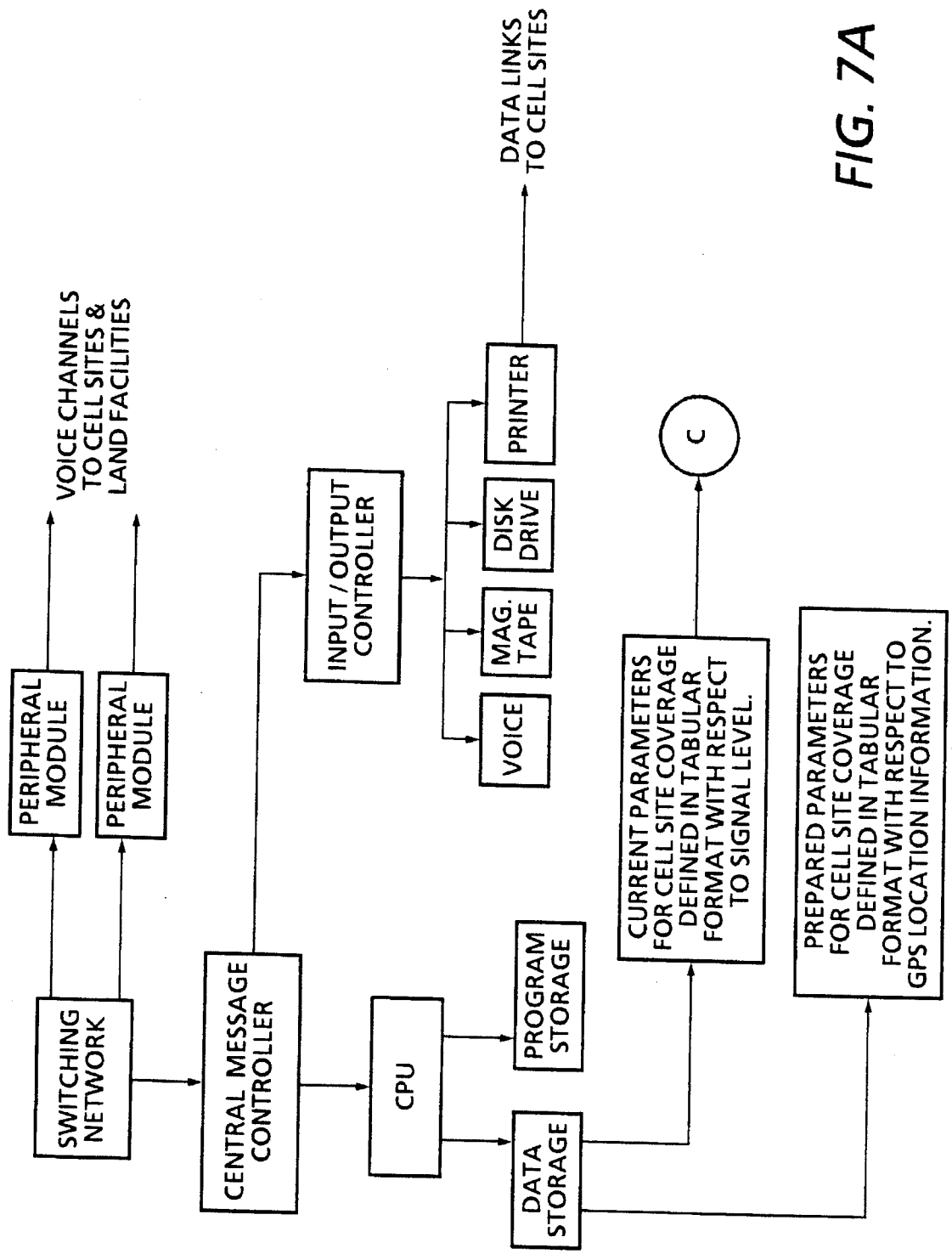
FIG. 7A is a block diagram showing systems included in the MTSO shown in FIG. 7.

Shown in FIGS. 6 and 7A is a cellular system 20 embodying the present invention. The cellular system 20 uses positional data associated with the mobile unit M' to make call management decisions. To this end, the cellular system 20, while similar in all other respects to the cellular system illustrated in FIGS. 2 and 3, includes means for accurately and precisely determining the exact position of the mobile unit M', and then further includes means for using this positional information to determine which cell site is best suited to handle a call associated with that mobile unit M'.

The means for accurately determining the precise position of the mobile unit includes a Global Positioning System. The GPS includes satellites, such as satellite 22 in geostationary orbit about the earth. Each mobile unit further includes a GPS receiver 24 located between the duplexer and the logic circuitry 25 of the mobile unit. The GPS receiver communicates with the satellite 22 and the exact longitude and latitude of the mobile unit are determined. This information is sent to the MTSO via a cell site, and the MTSO uses a look-up table such as disclosed in FIG. 9, containing the geographic location of each cell site in the cellular system, to determine which cell site is most appropriate for use by the mobile unit. The mobile unit communicates with cell sites using unused bits of the aforediscussed overhead messages to send its positional information to the MTSO when the mobile unit is first activated. This positional information is relayed to the MTSO by the first cell site to communicate with the mobile unit. The MTSO then selects the cell site most appropriate for the mobile unit and hands that mobile unit off to that cell site. The cell sites transmit system service boundaries in their overhead messages that are interpreted by mobile units. The mobile units use the location information supplied by the GPS receiver as opposed to signal strength to determine which system to originate on. Call termination can utilize the paging process as is currently utilized. A response from a mobile unit includes the location information, and the designated control channel instructs the mobile unit to tune to one of its channels. A call in progress utilizes the overhead message of the voice channel to communicate location information. Once a mobile unit that is call processing on a particular site crosses a cell boundary, it is instructed to perform a handoff to the cell that is to service the new location. It is understood that the GPS is used as an example of the preferred source of positional data; however, other sources similar to the GPS can be used without departing from the scope of the present invention. All that is required is that the source of positional data be able to generate precise and accurate locational data on a fixed or a rapidly moving object. It is also helpful, but not absolutely required, that the CMR be only passively involved in the determination of the positional data.

The handoff process is similar to the present handoff processes, except it will be controlled according to position of the mobile unit instead of signal strength. This position information is used to determine call rating and taxing for billing purposes and call routing to make sure that the proper services for that location are provided.

Figure 8:
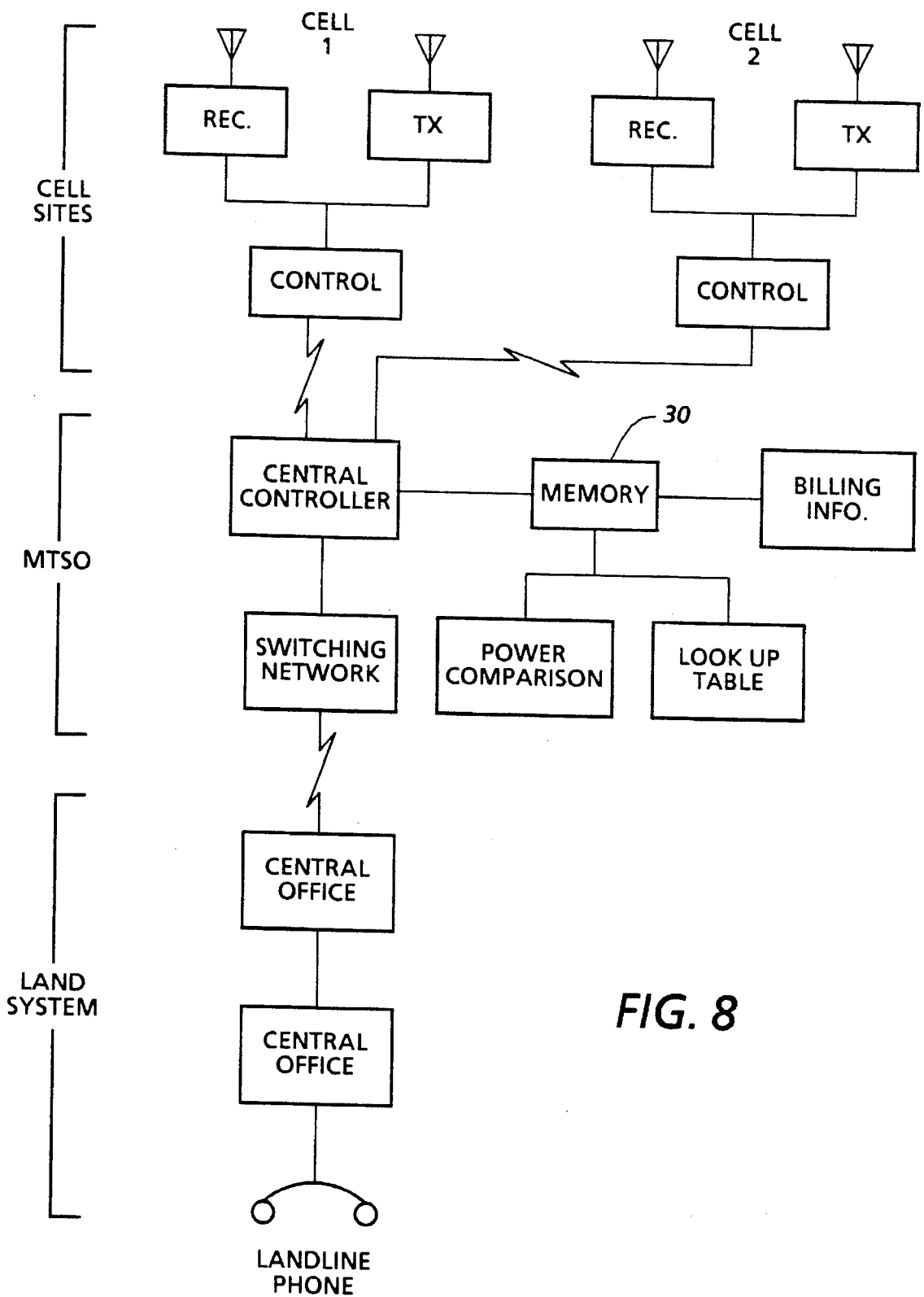
FIG. 8 is a block diagram illustrating the cellular system embodying the present invention.

A "locate request" signal is not used, since the exact location of the mobile unit is known to the MTSO. However, as indicated in FIG. 8, a signal strength method can also be used in making call management decisions if suitable. Such a process would be used if the mobile unit moves into a prior art cellular system.

A call using the cellular system of the present invention is illustrated in FIG. 11. Initial communication between a mobile unit and the MTSO is established using the overhead communication network described above. The mobile unit scans marker channels and initially locks onto the cell site that has the strongest signal. This cell site may not be the most appropriate cell site for use by that mobile unit, but it serves as an entre into the system. Once this initial communication is established, the mobile unit uses the GPS receiver 24 and GPS satellite 22 and to determine its exact geographic co-ordinates such as longitude and latitude. This information is then relayed to the MTSO using the originating cell site. The MTSO uses this information in conjunction with a look-up table such as shown in FIG. 9 to establish communication between the mobile unit and the cell site most appropriate to that mobile unit. The mobile unit is then handed off to that cell site. A call initiated by that mobile unit is routed through the appropriate cell site.

Figure 10:
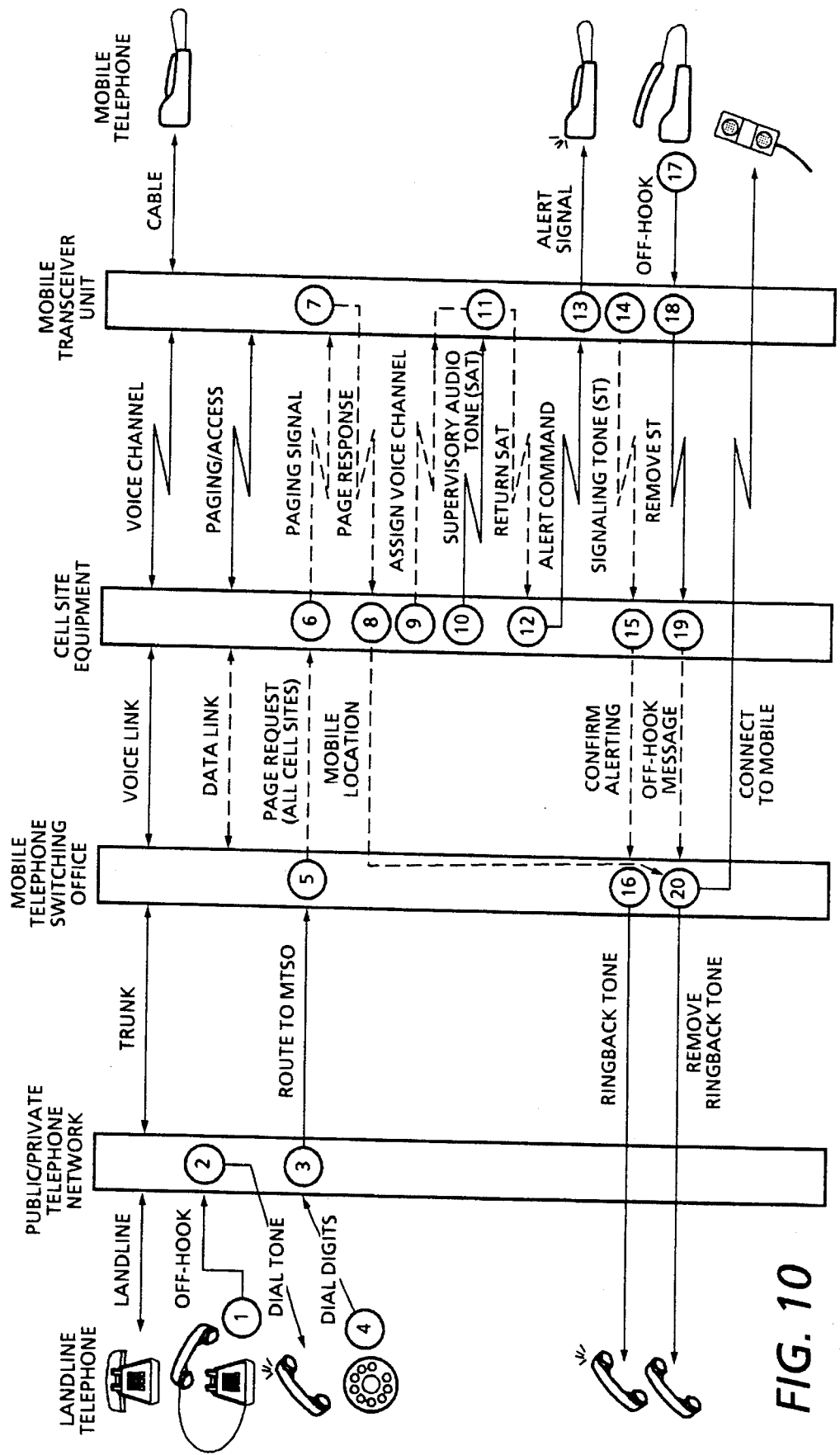
FIG. 10 is a block diagram illustrating a landline-to-mobile unit call in which position data are exchanged between the mobile unit and the MTSO.

As indicated in FIG. 11, business information associated with the call, can be recorded at the MTSO. As indicated in FIG. 10, the dotted lines represent data transmission that contains GPS information. It is also noted that since both a position controlled system and a signal strength system are included in the cellular system of the present invention, the MTSO can include a software system in the memory 30 shown in FIG. 8 to use the position controlled system, but to also test signal strength, and to use a signal strength controlled system if a signal still falls below a predetermined value when making call management decisions based on the position of the mobile unit. In this manner, the best of both systems can be obtained.

The system of the present invention can also be used to allow a mobile to place calls only on its home system at the decision of the mobile. The mobile locating features of the system could also be important in other contexts, such as emergencies or the like.

It is understood that while certain forms of the present invention have been illustrated and described herein, it is not to be limited to the specific forms or arrangements of parts described and shown.

We claim:

1. A cellular communications system that includes one or more cell sites and an MTSO said system comprising:

A) locating means in a cellular communications system for determining the exact geographic location of a mobile unit, said locating means including means using a satellite communication system for establishing an exact geographic location of said mobile unit and for emitting a position signal of said exact geographic location;

B) means in the MTSO for receiving the position signal and using that position signal to establish the exact geographic location of the mobile unit; and C) data means in the MTSO responsive to said locating means for providing billing information for said mobile unit based on the exact geographic location of the mobile unit, said data means including tables containing billing charges and positional data and means for comparing the exact geographic location of said mobile unit to the tables and assessing charges to said mobile unit based on said exact geographic location and for generating a call record for billing purposes.

2. The cellular communication system defined in claim 1 wherein said locating means includes a means for communicating with a satellite.

3. The cellular communication system defined in claim 2 wherein said means in the MTSO for determining the geographic location of a cell site includes a look-up table.

4. The cellular communication system defined in claim 3 wherein said locating means includes a GPS.

5. The cellular communication system defined in claim 3 wherein said locating means includes a GPS receiver connected to logic circuitry in said mobile unit.

6. The cellular communications system defined in claim 5 wherein said mobile unit includes a duplexer.

7. The cellular communications system defined in claim 6 wherein said mobile unit includes a GPS receiver located between said duplexer and said logic circuitry.

8. The cellular communications system defined in claim 7 further including means for placing location data on voice and data communication signals.

9. The cellular communications system defined in claim 8 further including means for making call management decisions based on signal strength.

10. A cellular communications system that includes one or more cell sites and an MTSO, said system comprising:

locating means in a cellular communications system for determining the exact geographic co-ordinates of a mobile unit; and means for making billing-related call decisions based on the geographic co-ordinates of the mobile unit and including tables containing billing charges and positional data and means for comparing the exact geographic co-ordinates of said mobile unit to the tables and assessing charges to said mobile unit based on said exact geographic co-ordinates and for recording billing information.

11. A method of generating bills and billing customers for calls Associated with mobile unit in a cellular telephone system having a plurality of cell sites at various geographic locations and an MTSO comprising:

A) establishing exact geographic co-ordinates for a mobile unit;

B) establishing billing-related records based on the exact geographic co-ordinates of said mobile unit; and C) using the billing-related records to bill customers for calls associated with the mobile unit.

12. The method defined in claim 11 further including a step of handing off the mobile unit to a second cell site based on the position of the mobile unit.

13. The method defined in claim 12 further including a step of continuously monitoring the position of the mobile unit as the mobile unit moves, and handing off the mobile unit to various cell sites based on the instantaneous location of the mobile unit.

14. The method defined in claim 13 further including assessing message unit charges to a call made from the mobile unit.

15. The method defined in claim 13 wherein said call management decisions include deciding which cell site will initially handle a call to or from a mobile unit.

16. A cellular communications system that includes one or more cell sites and an MTSO, said system comprising:

A) locating means in a cellular communications system for determining the exact geographic co-ordinates of a mobile unit and emitting a position signal corresponding to said exact geographic co-ordinates;

B) means for receiving the position signal and using that position signal to establish the exact geographic co-ordinates of the mobile unit; and C) data means responsive to said means for receiving the position signal for defining billing-related information for said mobile unit based on the exact geographic co-ordinates of the mobile unit, said data means including tables containing billing charges and positional data and means for comparing the exact geographic co-ordinates of said mobile unit to the tables and assessing charges to said mobile unit based on said exact geographic location and for generating a call record for billing purposes.

17. A cellular communications set up comprising:

A) a cellular communications system;

B) a system boundary defining an authorized area for said cellular communications system;

C) at least one intra-system cell site that provides service within said authorized area;

D) an MTSO for said cellular communications system;

E) a neighboring cellular carrier that provides service outside of said authorized area;

F) at least one inter-system cell site that provides service outside of said authorized area, said at least one inter-system cell site being associated with said neighboring cellular carrier;

G) said cellular communications system and said neighboring cellular carrier being subject to inter-system interference;

H) locating means for determining the exact geographic location of a mobile unit, said locating means including means using a satellite communication system for establishing an exact geographic location of the mobile unit and for emitting a position signal of said exact geographic location;

I) means for receiving said position signal and using that position signal to establish the exact geographic location of the mobile unit visa vis said at least one intra-system cell site in said cellular communications system; and J) data storage and comparison means in said MTSO responsive to said means for receiving the position signal and storing cell site geographic data for each intra-system cell site in said cellular communications system and effecting a comparison between said position signal and the cell site geographic data and selecting a chosen cell site that services the geographic location of the mobile unit for use by the mobile unit based on such comparison and accepting the call from said mobile unit if the chosen cell site provides service within said authorized area for reducing provision of cellular service by said cellular communications system outside of said authorized area and reducing interference between said cellular communications system and said neighboring cellular carrier.

18. A cellular communications set up comprising:

A) a system boundary defining an authorized area for a cellular communications system;

B) at least one intra-system cell site that provides service within said authorized area;

C) an MTSO for said cellular communications system;

D) a neighboring cellular carrier providing service outside of said authorized area;

E) at least one cell site for said neighboring cellular carrier that provides service outside of said authorized area, the at least one cell site for said neighboring cellular carrier being an inter-system cell site with respect to said cellular communications system;

F) said cellular communications system and said neighboring cellular carrier being subject to inter-system interference;

G) locating means for determining the exact geographic location of a mobile unit; and H) management means in said MTSO responsive to said locating means for making management decisions based on the geographic location of the mobile unit, said management means including means for storing geographic data for each intra-system cell site in the cellular communications system and for comparing the exact geographic location of the mobile unit to the geographic data and for selecting a chosen cell site that services the geographic location of the mobile unit for use by the mobile unit based on such comparison and using the chosen cell site if that chosen cell site is an intra-system cell site for reducing provision of cellular service by said cellular communications system outside of said authorized area and reducing interference between said cellular communications system and said neighboring cellular carrier.

19. The cellular communications system defined in claim 17 wherein accepting the call includes generating billing information.

20. The cellular communications system defined in claim 18 wherein accepting the call includes generating billing information.

* * * * *